Patented Mar. 23, 1948

2,438,168

UNITED STATES PATENT OFFICE 2,438,168

STABILIZATION OF SHELL EGGS

Walter R. Hearst and Gabrielle M. Hearst, San Francisco, Calif.

No Drawing. Application September 25, 1944, Serial No. 555,754

4 Claims. (Cl. 99—170)

This invention relates to the stabilization of shell eggs; and it includes a process of preserving fresh edibles subject to deterioration upon aging wherein an oil-in-water emulsion is prepared by mixing a plurality of waxes of different melting points with an aqueous phase, a preservative and an emulsifying agent, and said emulsion is applied as a thin coating on a fresh edible, said waxes being irradiated prior to or after their application to said edible with a radiation having a wave length within the range of ultra-violet light to X-rays, whereby an enhanced preserving effect is produced. Our invention also includes the emulsified coating composition and the coated edible produced by the described process, all as more fully hereinafter set forth and as claimed.

In the prior art it is known to preserve fresh fruits and vegetables, eggs and the like by applying thereto coatings composed of mineral oils, waxes and the like. It has also been established that coatings of this type are more effective when applied in emulsified form. And it is known that emulsions of this type should be free from electrolytes in order to produce best results. However, prior art methods have left much to be desired, especially since the shortage of refrigeration space has greatly limited the shipment of fresh edibles of all types.

We have discovered the surprising fact that irradiation of the waxes employed in preservative coatings, either before or after application to the fresh edibles, substantially increases the preservative properties of the coatings. We have actually found that eggs, for example, preserved with the irradiated waxes of the present invention, can be stored for periods as long as 3 months at room temperatures (75–80° F.) while still being edible and that they can be stored for periods of over 9 months even without refrigeration without detectible deterioration. The cause for these surprising results, produced by the irradiation of the waxes in the preservative coatings, is not at all clear. It is not due to the destruction of bacteria present on the eggs themselves since the enhanced effect is not produced by irradiation of the eggs prior to coating. And it cannot be explained as being due to the destruction of bacteria in the waxes since these are thoroughly sterilized during the preparation of the coating emulsions. But whatever the true explanation may be, the facts remain as stated.

The enhanced preserving effect of our invention can be produced by irradiating either the waxes, with the preservative incorporated, before emulsification thereof or the emulsion itself or the preservative coating after or during application to the edibles. This result can be accomplished by the use of radiation having a wave length within the range of ultra-violet to X-rays, that is, through the range of ultra-short waves. We prefer to employ ultra-violet waves, as produced by the conventional mercury vapor lamps. The radiation can be applied while the emulsion is in the form of a film, as when applied to the edibles, but it is somewhat more convenient to irradiate the emulsion during its manufacture, for example in the mixing vessel during mixing. When the preservative coatings are irradiated, it requires only a few minutes exposure to the radiation produced by a small mercury vapor lamp placed at a distance of about 2 feet to produce the desired results. If the emulsion is irradiated while it is being prepared adequate irradiation is produced within a period of about 30 minutes. Additional irradiation, for example over a period of 5 hours, can be employed but the increased efficiency of preservation thereby produced is not great.

The waxes employed in our process can be of mineral, animal or vegetable origin. Examples are beeswax, montan wax, ceresin, paraffin, petrolatum and the like. It is important to employ a plurality of waxes of differing melting point since this tends to compensate for fluctuation of temperature during storage. The waxes of higher melting point are advantageously of the micro-crystalline type for higher plasticity and elasticity. It is usually necessary to incorporate an oil, such as a paraffin oil, in the composition in order to lower the melting point of the mixture and to serve as a plasticizer. All waxes and oils employed should be refined and of the best grade.

A preservative must be incorporated in the emulsion. This should be soluble in the waxes and is preferably at least partly soluble in water. It should, however, be a non-electrolyte. It is, of course, important to select a non-poisonous preservative which is acceptable under the "Pure Food and Drug Act." Any preservative of this type can be used. Suitable preservatives which can be used include the low molecular esters of p-hydroxy benzoic acid, such as the methyl, ethyl and propyl esters, for example.

The emulsifying agent employed in our process may be any non-electrolytic emulsifying agent capable of producing oil-in-water emulsions which qualify under the pure food and drug laws. Agar agar and partially esterified polyhydric alcohols, such as glyceryl monostearate, are examples of suitable emulsifying agents.

Distilled water should be employed in the emulsion and it is desirable that all ingredients be tested for their hydrogen ion concentration. The final emulsion should be as close to neutral (pH of 7) as possible.

In making the emulsion a satisfactory procedure is to melt the waxes and oils together in an emulsifying machine and to add the preservative to the molten mass. The water phase, containing the emulsifying agent and distilled water, may be separately heated to approximately the temperature of the molten oil phase and then gradually added to the latter under conditions of agitation. The preservative and the emulsifying agent may be added to either phase or a part to each phase. It is also possible to produce emulsification by carefully adding the aqueous phase when cold to the molten mass of waxes and oils while applying heat to the mixture. Agitation should be continued until the emulsion has substantially reached room temperature.

The following specific examples represent practical illustrative operating embodiments of our process and capable of producing the articles of this invention.

Example 1

The following mixture of waxes and oils was introduced into a jacketed stirring vessel and melted therein at a temperature of about 140° F.

| | Percent by weight |
|---|---|
| Microcrystalline paraffin wax, M. P. 155° F | 4.95 |
| Microcrystalline paraffin wax, M. P. 140° F | 3.31 |
| Paraffin wax, M. P. 133° F | 4.95 |
| Paraffin wax, M. P. 125° F | 4.95 |
| Paraffin wax, M. P. 121° F | 4.95 |
| White petrolatum | 4.62 |
| Paraffin oil #15 | 19.31 |

To the molten mass 2.19% by weight of the propyl ester of p-hydroxy benzoic acid was added.

The water phase to be added was prepared by mixing together and heating to a temperature of about 140° F. the following components:

| | Percent by weight |
|---|---|
| Glyceryl monostearate | 11.00 |
| Distilled water | 37.57 |
| Ethyl ester of p-hydroxy benzoic acid | 2.19 |

This water phase was then slowly added to the molten oil phase while agitating continuously. The mixture was then homogenized in the machine while being irradiated by an ultra violet lamp. Irradiation and stirring were continued until the temperature fell to about 82° F. At this temperature the emulsion was highly viscous.

Example 2

In this example we melted the following mixture of waxes and oils in a jacketed stirring vessel, while heating to a temperature of about 140° F.

| | Percent by weight |
|---|---|
| Cercon Snowdrift wax, M. P. 155° F. (microcrystalline) | 15 |
| Cercon Snowdrift wax, M. P. 115° F. (microcrystalline) | 10 |
| Paraffin oil #15 | 21 |
| Propyl ester of p-hydroxy benzoic acid | 2 |

The water phase was made by heating the following components to a temperature of about 140° F.

| | Percent by weight |
|---|---|
| Glyceryl monostearate | 10 |
| Distilled water | 40 |
| Ethyl ester of p-hydroxy benzoic acid | 2 |

The two phases were mixed and irradiated by the same procedure used in Example 1.

In a practical test of the preservative action of the product of Example 1, day old eggs were used. One lot of these eggs was coated with the preservative of Example 1 by spraying and brushing them with the molten preservative. A second lot was coated in the same manner with a similar preservative which however had not been irradiated, while a third lot was used untreated as a check sample or blank. These eggs were first weighed carefully and then stored for a period of 3 months at room temperature (75 to 80° F.). The lots were again weighed to determine the loss in weight due to dehydration, this being one of the best ways of determining the rate of deterioration of eggs during storage. The eggs were then broken and the condtiion of their whites and yolks was scored using a Van Wagenen chart for the whites similar to that given by W. A. Lippincott and L. S. Card in "Poultry Production," 8th ed., 1939, page 483. The yolks were scored using a similar scale ranging from 1 to 5, with 5 representing the higher deterioration. The same lot of eggs measured within 4 to 8 hours after laying were found to have white and yolk scores of about 0.5 on these scales. The results obtained in this series of tests are summarized in the following table.

| | Average weight fresh | Average weight after 3 months | Loss | Whites Score | Yolks Score |
|---|---|---|---|---|---|
| | Grams | Grams | Per cent | | |
| Treated (Irradiated) | 56.7 | 55.0 | 3.0 | 3.3 | 2.6 |
| Treated (Not irradiated) | 57.0 | 53.6 | 6.0 | 4.2 | 4.0 |
| Untreated (Blank) | 58.9 | 42.1 | 28.5 | 4.8 | 4.6 |

It will be seen that the product which was irradiated in accordance with our process produced a 50% reduction in loss of weight over the three months period as compared with a product which had not been irradiated. This is believed to be a highly surprising result showing the effectiveness of an inherent preserving action developed as a result of the irradiation.

While we have described what we consider to be the best embodiments of our process, it is evident, of course that the specific procedures which have been described can be varied considerably without departing from the purview of this invention. In obtaining the advantages of our invention it is only necessary to produce a wax coating on the edible articles. the waxes having been irradiated. It is advantageous, of course, that the coating contain a preservative and that it be applied in the form of an aqueous emulsion but these features are not essential. It is believed that any one skilled in the art, with the aid of the specific examples which we have given, would be able to make a suitable choice of waxes, oils, preservatives and emulsifying agents to be incorporated in our preservative coating compositions. Any convenient source of ultraviolet light can be used for irradiation purposes. And a wide selection of waxes, plasticizers, preservatives and emulsifying agents can be employed. The waxes employed generally have melting points falling within the range of about 100° to 170° F. The emulsified coating compositions can be applied to the edibles by dipping or spraying methods. The entire outer surface of the edibles must be coated with a thin film and it is important that the edibles be strictly fresh. Fruit or vegetables which have been bruised, for example, should not be used. The preservative film produced in the manner described will resist temperature change and will not be injured by handling, packing or in transport. Further modifications of our process which fall within the scope of the following claims will be immediately evident to those skilled in this art.

What we claim is:

1. In the preservation of eggs in the shell the process which comprises preparing an oil-in-water emulsion from a plurality of waxes of different melting points applying said emulsion as a coating to said eggs and irradiating said waxes with ultra-violet rays prior to the coating operation.

2. In the preservation of eggs in the shell the process which comprises preparing an emulsion by mixing together a plurality of waxes of different melting points with an aqueous solution and with a preservative, coating the eggs with a thin adherent film of said emulsion and irradiating said waxes with ultra-violet rays prior to the coating operation.

3. In the preservation of shell eggs, the process which comprises heating a mixture of waxes of different melting points and a plasticing oil to the melting point of the mixture, separately heating an aqueous phase to approximately the same temperature, then adding the aqueous phase to the melted mixture of waxes and oils and agitating the mixture in the presence of a preservative and an emulsifying agent to produce an emulsified coating composition, and coating said eggs with a thin film of said composition, the said waxes being irradiated with ultra-violet light prior to the coating operation.

4. In the preservation of eggs in the shell, the process which comprises heating a mixture of a plasticizing oil and a plurality of waxes, having different melting points ranging from about 100° F. to 170° F., to the melting point of said mixture, adding to the mixture distilled water, a low-molecular ester of p-hydroxy benzoic acid as a preservative and a partially esterified polyhydric alcohol as an emulsifying agent, agitating the mixture to produce emulsification until it has cooled substantially to its solidification point, irradiating the emulsion with ultra-violet light and then coating the eggs with the irradiated emulsion.

WALTER R. HEARST.
GABRIELLE M. HEARST.

REFERENCES CITED

The following references are of record in the file of this patent:

UNITED STATES PATENTS

| Number | Name | Date |
|---|---|---|
| 694,899 | Stukes | Mar. 4, 1902 |
| 1,626,814 | Goodall | May 3, 1927 |
| 2,173,992 | Allen | Sept. 26, 1939 |
| 2,222,000 | Schmidt | Nov. 19, 1940 |

FOREIGN PATENTS

| Number | Country | Date |
|---|---|---|
| 364,128 | Great Britain | 1931 |

OTHER REFERENCES

American Journal of Surgery, Feb. 1933, pages 244 to 249, "Ultra-violet Irradiated Petrolatum," by Eising.